No. 631,409. Patented Aug. 22, 1899.
A. SMITH.
POTATO CUTTER.
(Application filed July 30, 1898.)
(No Model.)
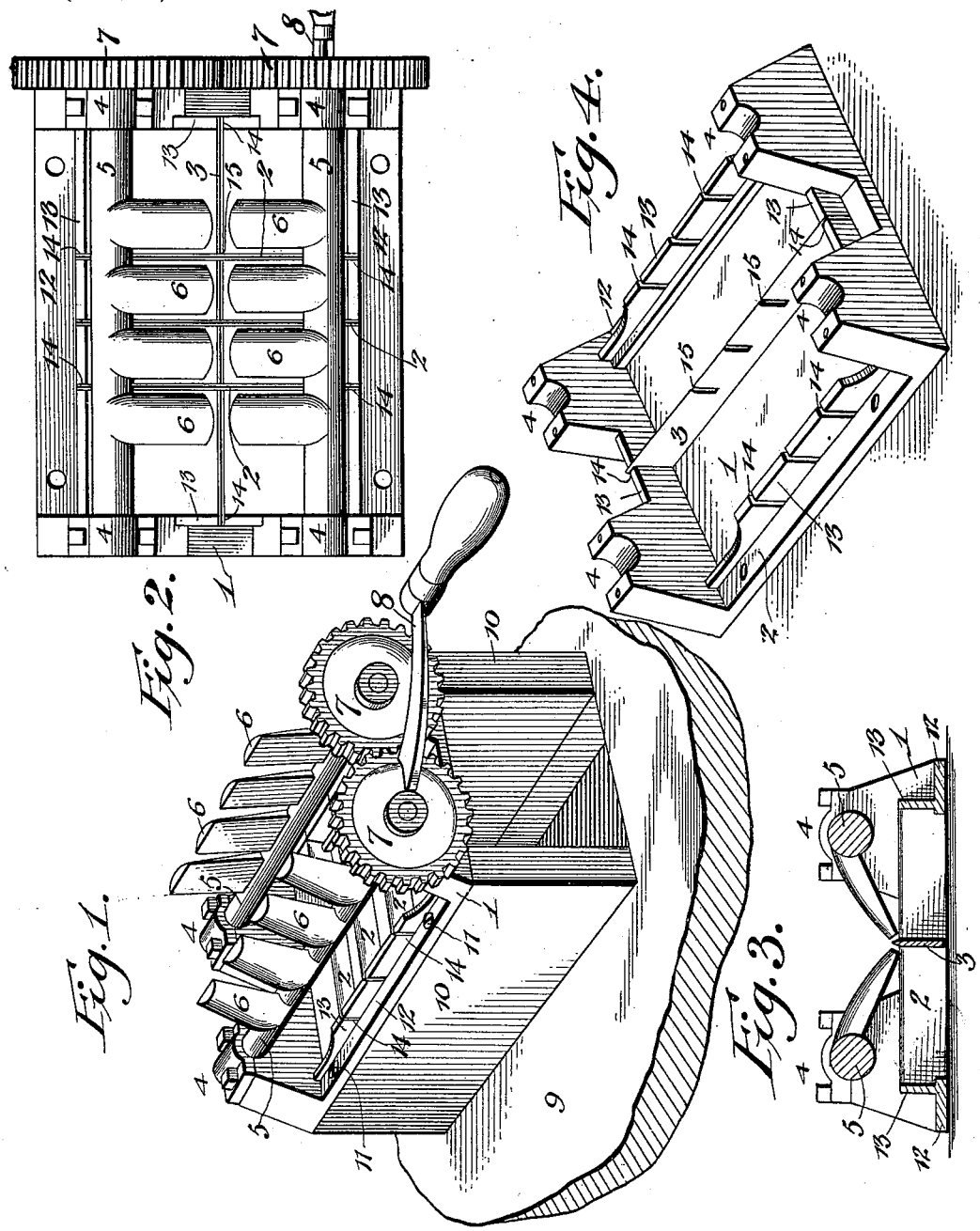
Witnesses
Atley Smith, Inventor.
By his Attorneys.

UNITED STATES PATENT OFFICE.

ATLEY SMITH, OF DAYTON, WYOMING.

POTATO-CUTTER.

SPECIFICATION forming part of Letters Patent No. 631,409, dated August 22, 1899.

Application filed July 30, 1898. Serial No. 687,286. (No model.)

*To all whom it may concern:*

Be it known that I, ATLEY SMITH, a citizen of the United States, residing at Dayton, in the county of Sheridan and State of Wyoming, have invented a new and useful Potato-Cutter, of which the following is a specification.

This invention relates to vegetable-cutters, and is especially designed to cut seed potatoes.

To this end the device consists of a frame or base carrying a series of crossed knife-blades and a pair of parallel shafts journaled above the knife-blades and provided with fingers, the shafts being geared together and adapted to turn simultaneously and work the fingers between the knife-blades to cut the potatoes into pieces for planting purposes.

Further objects and advantages of the device will be hereinafter more fully described, shown in the drawings, and particularly pointed out in the claim.

In the drawings, Figure 1 is a perspective view of the device mounted in position for use. Fig. 2 is a top plan view thereof with the fingers turned down between the knife-blades. Fig. 3 is a transverse sectional view thereof. Fig. 4 is a detail perspective view of the frame of the device.

Corresponding parts in the several figures are denoted by like characters of reference.

Referring to the drawings, the device comprises a rectangular base or frame 1, having a number of transverse knife-blades 2, arranged within and at the bottom of the frame, and a longitudinal knife-blade 3, arranged midway between the sides of the frame and crossing the transverse knives. Journaled above the knives in boxes 4 at each corner of the frame and parallel with one another are a pair of shafts or rollers 5, each provided with oppositely-arranged inwardly-extending fingers 6. Each of these rollers is provided on its respective end and outside of the frame with a gear-wheel 7. These wheels intermesh, as shown, and one of them is provided with an operating-crank 8, whereby the shafts may be rocked in opposite directions.

In mounting the device for use, as in Fig. 1, an opening is provided through the top of a table or bench 9 of a size corresponding to that of the interior of the frame 1, and the device is mounted directly over this opening and spaced a few inches above the same upon blocks 10, to which the frame is secured by means of screws 11, passing through the side flanges 12. When the device is thus mounted, the crank 8 is operated to turn the fingers 6 back out of the way, as shown in Fig. 1, and the potatoes placed upon the knife-blades. The crank is then operated to throw the fingers into the position shown in Fig. 3, whereby the potatoes are pressed against the sharp edges of the knife-blades and severed or cut into pieces and drop through the opening in the table to a suitable receptacle placed thereunder. The pieces of potatoes cannot stick to the knives, as the fingers 6, working therebetween, scrape the pieces therefrom. It is not always necessary to throw the fingers back as far as indicated in Fig. 1, but only far enough to introduce a potato, and they may be placed longitudinally or transversely upon the knives.

The frame is preferably cast or formed in a single piece, as shown in Fig. 4, including the sides 13, the flanges 12, and the journal-boxes 4. The sides 13 are provided with vertical slots 14, in which the ends of the knife-blades are mounted. The longitudinal blade 3 is mounted at the ends of the frame in the slots between the boxes and is provided with vertical slots 15, alined with slots 14 in the sides of the frame, so as to receive the transverse knife-blades and mount them securely in position.

The construction and arrangement as herein described provides a simple and useful device of the character described, being composed of few parts which are easily cleaned and replaced if broken or worn.

Changes in the form, proportion, and minor details may be made without departing from the spirit and scope of my invention, and therefore I do not wish to be understood as limiting myself to the precise construction and arrangement as herein set forth.

Having thus described the invention, what is claimed, and desired to be secured by Letters Patent, is—

In a device of the class described, the combination with an open substantially rectangular frame, having bearings located at the respective corners of the frame, extending above the plane thereof, and the bearings at the respective sides of the frame being alined longitudinally thereof, of an intermediate longitudinal knife-blade supported by the opposite ends of the frame, transverse knife-blades intersecting the longitudinal blade, rock-shafts mounted in the respective longitudinal pairs of bearings, and thereby spaced above the knife-blade, and provided with oppositely-alined inwardly-extending fingers working at opposite sides of the intermediate longitudinal blade and between the adjacent transverse blades, and means for simultaneously rocking the shafts, substantially in the manner shown and described.

In testimony that I claim the foregoing as my own I have hereto affixed my signature in the presence of two witnesses.

ATLEY SMITH.

Witnesses:
V. C. SHICKLEY,
M. M. NEEVES.